(12) United States Patent
Robertson et al.

(10) Patent No.: US 8,358,308 B2
(45) Date of Patent: Jan. 22, 2013

(54) USING VISUAL TECHNIQUES TO MANIPULATE DATA

(75) Inventors: George G. Robertson, Seattle, WA (US); Danyel A. Fisher, Seattle, WA (US); Bongshin Lee, Issaquah, WA (US); Roland L. Fernandez, Woodinville, WA (US); Lev Boris Nachmanson, Redmond, WA (US); Timothy Garry Dwyer, Kirkland, WA (US); Mikkel Ronne Jakobsen, Vanlose (DK); Olga Kulyk, Redmond, WA (US); Matthew Jay Kotler, Sammamish, WA (US); Kipper V. Jewsbury, Seattle, WA (US); Brian L. Welcker, Seattle, WA (US); Gur Kimchi, Bellevue, WA (US); Morten Holm-Peterson, Gentofte (DK); Stella Yick Chan, Redmond, WA (US); Jason J. Weber, Kirkland, WA (US); B. Scott Ruble, Bellevue, WA (US); Murali R. Krishnan, Bellevue, WA (US); Benjamin L. Chronister, Duvall, WA (US); Christian Olaf Abeln, Ödåkra (DE)

(73) Assignee: Microsoft Corporation, Redmond, WA (US)

( * ) Notice: Subject to any disclaimer, the term of this patent is extended or adjusted under 35 U.S.C. 154(b) by 1075 days.

(21) Appl. No.: 12/163,759

(22) Filed: Jun. 27, 2008

(65) Prior Publication Data
US 2009/0322756 A1 Dec. 31, 2009

(51) Int. Cl.
*G06T 11/20* (2006.01)
(52) U.S. Cl. .................................................. 345/440
(58) Field of Classification Search ............ 345/440
See application file for complete search history.

(56) References Cited

U.S. PATENT DOCUMENTS

| | | | |
|---|---|---|---|
| 5,515,488 A * | 5/1996 | Hoppe et al. ............. 345/440 |
| 6,237,006 B1 * | 5/2001 | Weinberg et al. ......... 707/797 |
| 6,326,962 B1 * | 12/2001 | Szabo ...................... 715/762 |
| 6,363,377 B1 | 3/2002 | Kravets et al. |
| 6,404,446 B1 * | 6/2002 | Bates et al. ............... 715/854 |
| 6,629,097 B1 | 9/2003 | Keith |
| 6,775,659 B2 * | 8/2004 | Clifton-Bligh ............. 1/1 |
| 7,251,637 B1 | 7/2007 | Caid et al. |
| 7,333,984 B2 | 2/2008 | Oosta |
| 7,334,195 B2 | 2/2008 | Gemmell et al. |

(Continued)

OTHER PUBLICATIONS

RAO. From Unstructured Data to Actionable Intelligence. Nov./Dec. 2003 IT Pro. 1520-9202/03 IEEE. http://www.inxight.com/pdfs/f6raolo.pdf. Last accessed Apr. 24, 2008, 7 pages.

(Continued)

*Primary Examiner* — Jeffrey Chow
(74) *Attorney, Agent, or Firm* — Lee & Hayes, PLLC

(57) ABSTRACT

Various types of data can be collected into a data set and related content and/or related concepts across the data in the data set and/or across search histories can be displayed as a visual representation. The related content/concepts can be presented as a function of incremental revealing of relationships. After reviewing the visual representation, a user can customize the data set and relationships by specifically excluding a related data segment. The visual representation can be applied across multiple searches or other obtained data. Through interaction with the visual representation, a user can drill down into common linkages of the data to more narrowly focus on a subset of the data and/or to refocus a search result and/or to provide annotations.

19 Claims, 11 Drawing Sheets

U.S. PATENT DOCUMENTS

| | | | |
|---|---|---|---|
| 7,694,212 B2* | 4/2010 | Fikes et al. | 715/200 |
| 2002/0091679 A1* | 7/2002 | Wright | 707/3 |
| 2005/0114786 A1* | 5/2005 | Decombe | 715/764 |
| 2005/0171940 A1 | 8/2005 | Fogg et al. | |
| 2005/0278321 A1 | 12/2005 | Vailaya et al. | |
| 2006/0106793 A1 | 5/2006 | Liang | |
| 2006/0161535 A1* | 7/2006 | Holbrook | 707/3 |
| 2006/0167889 A1 | 7/2006 | Mitchell et al. | |
| 2007/0022135 A1* | 1/2007 | Malik | 707/102 |
| 2007/0073748 A1 | 3/2007 | Barney | |
| 2007/0162443 A1 | 7/2007 | Liu et al. | |
| 2008/0244429 A1* | 10/2008 | Stading | 715/764 |
| 2008/0301739 A1* | 12/2008 | Goldeen et al. | 725/88 |

OTHER PUBLICATIONS

Cugini, et al. Design of 3-D Visualization of Search Results: Evolution and Evaluation, NIR VE Paper. http://www.itl.nist.gov/iaui/vvrg/cugini/uicd/nirve-paper.html. Last accessed Apr. 24, 2008, 20 pages.

Tianamo 3D Web Search, Apr. 1, 2008. http://infosthetics.com/archives/2008/04/tianamo_3d_web_search.html. Last accessed Apr. 24, 2008, 3 pages.

* cited by examiner

USING VISUAL TECHNIQUES TO MANIPULATE DATA

BACKGROUND

Conventional computer-based search, in general, is extremely text-centric in that search engines typically analyze alphanumeric search queries in order to return results. To the extent visualization is incorporated into a search, it is often performed through use of metadata, for example, where items are manually pre-tagged with metadata corresponding to physical attributes of the visual item. In other words, traditional search engines employ pre-indexed metadata in order to return image data in response to a search query.

To maximize likelihood of locating relevant information amongst an abundance of data, search engines are often employed over the web or a subset of pages thereof. A search engine is a tool that facilitates web navigation based on entry of a search query comprising one or more keywords. Upon receipt of a query, the search engine retrieves a list of websites, typically ranked based on relevance to the query. To enable this functionality, the search engine must generate and maintain a supporting infrastructure.

Upon entry of one or more keywords as a search query, the search engine retrieves information that matches the query from an index, ranks the sites that match the query, generates a snippet of text associated with matching sites and displays the results to a user. Furthermore, advertisements relating to the search terms can also be displayed together with the results. The user can thereafter scroll through a plurality of returned sites, ads, and the like in an attempt to identify information of interest. However, this can be an extremely time-consuming and frustrating process as search engines can return a substantial number of sites. Many times, the user is forced to narrow the search iteratively by altering and/or adding keywords and operators to obtain the identity of websites including relevant information.

SUMMARY

The following presents a simplified summary in order to provide a basic understanding of some aspects of the disclosed examples. This summary is not an extensive overview and is intended to neither identify key or critical elements nor delineate the scope of such aspects. Its purpose is to present some concepts in a simplified form as a prelude to the more detailed description that is presented later.

In accordance with one or more examples and corresponding disclosure thereof, various aspects are described in connection with providing a visual representation of a collection of data, wherein the visual representation can be customized based on a segment of at least one data from the collection of data. The collection of data can include structured data, unstructured data, or combinations thereof. Relationships between two or more data of the collection can be visually represented as customizable linked paths or connectors to show related content concepts or customizable unlinked paths or connections to illustrate unrelated content concepts. Annotations can be associated with the paths or connectors linking the data. Further, a user can selectively apply filtering to the visual representation, such as by explicitly excluding a related concept. In accordance with some aspects, a search query can be constructed based on the visualization wherein a user can drill into linkages in order to further customize the resulting visualization.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the various aspects may be employed. Other advantages and novel features will become apparent from the following detailed description when considered in conjunction with the drawings and the disclosed examples are intended to include all such aspects and their equivalents.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

As used in this application, the terms "component", "module", "system", and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Figure 1:
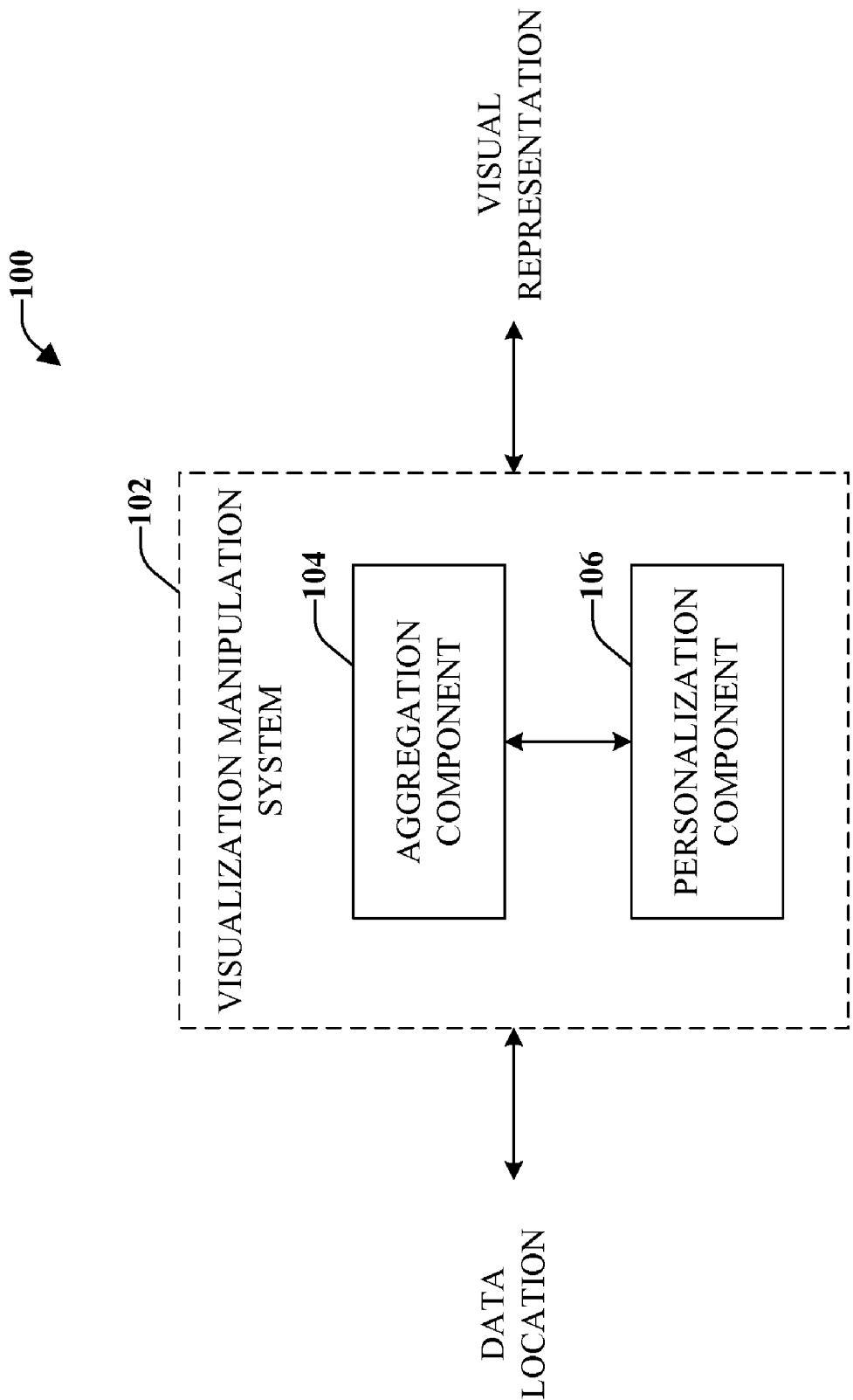
FIG. 1 illustrates a system that facilitates manipulation of visualized data.

FIG. 1 illustrates a system 100 that facilitates manipulation of visualized data. The data that is visualized (e.g., presented as a visual representation) can be structured data, unstructured data, semi-structured data, or combinations thereof. As used herein, unstructured data refers to data that does not have descriptive data, metadata, or parameters describing the data contained therein. Likewise, structured data refers to data that does have descriptive data, metadata, or parameters describing the data contained therein.

Figure 2:
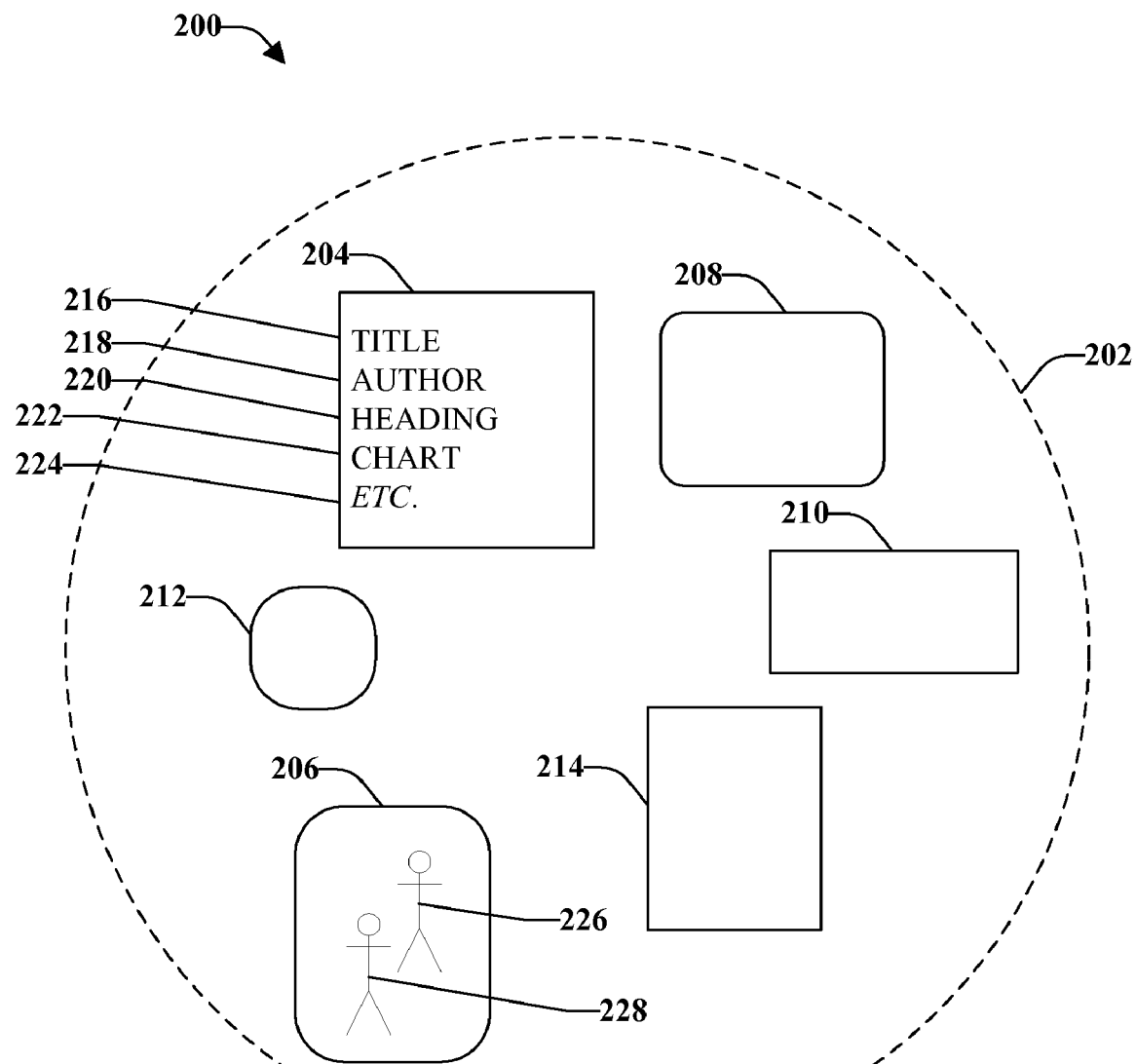
FIG. 2 illustrates a simple example of a visual representation in accordance with the various aspects presented herein.

In order to fully appreciate this detailed description, FIG. 2 illustrates a simple example of a visual representation 200 in accordance with the various aspects presented herein. It should be understood that the visual representation 200 is provided herein for clarification of the terminology utilized throughout this detailed description. A "data set" 202 is a collection of data. The data (structured, semi-structured, and/or unstructured) can be in various formats (e.g., text, document, spreadsheet, website, HTML file, email, and so forth) and from a multitude of sources (e.g., Internet, a computer readable storage medium, a local database, a remote database, and so on). As illustrated, the data set 202 can include any number of data or any type of data. Examples of "data" within the data set are illustrated as data 204, 206, 208, 210, 212, and 214. The data 204-214 are different geometric shapes and sizes in order to illustrate that the data does not have to be of the same type (e.g., document, image, and so forth).

Further, each data 204-214 can be subdivided into "segments", which are portions or categories within each data 204-214. For example, data 204 is a text document that includes a number of segments, such as "Title" 216, "Author" 218, "Heading" 220, "Chart" 222, and so forth (e.g., etc. 224) up to n number of segments, were n is an integer. Additionally or alternatively, a segment of a text document can be a word, a string, a character, and so forth, or combinations thereof. Further, there can be duplicates of the same type of segment. For example, there can be two authors, wherein each author's name represents one segment or the combination of names represents a segment. There can also be multiple headings, wherein each heading constitutes a segment or the combination of headings represents a segment.

In another example, data 206 is represented as an image and can include various segments that relate to the information contained in the image. For example, a first person represents a first segment 226 and a second person represents a second segment 228. In accordance with some aspects, a combination of elements constitutes a segment. For example, a first segment relates to "Lisa Johnston", a second segment relates to "Lou Johnston", a third segment relates to "Lisa and Lou Johnston", a fourth segment relates to "Mr. and Mrs. Johnston", and so forth. As such, segments within the image data 206 and other data, such as text data 204, can be related with a linkage, such as a connection line or another type of visual linkage between two or more data. For example, a person in the picture data 206 is the author of the text data 202 and, therefore, a connection line can be drawn between the data 204 and 206 to illustrate the connection of the data.

With reference again to FIG. 1, when a conventional system is utilized to conduct a search for data, such as by utilizing an Internet Search Engine, the results are provided in a list format that does not clearly define relationships between the different, seemingly unrelated results. For example, fifty search results (that represent a data set) can be presented in an inferred order of relevance, however, there is no easy way for the user to visually comprehend how the third result returned is related (or not related) to the last result returned. As such, results that do not seem to apply are usually ignored by the user since the relevance to the other search results (or the search itself) is not understood. Further, since the search results are presented in an inferred order of relevance, there is no context of time and, therefore, some of the results can be out of date or so old that the information contained therein is no longer applicable. In order to purge the older items, a user has to review each result to find the most current results, which can waste time and other valuable resources.

System 100 utilizes visualization techniques to establish relationships between data in the data set (e.g., returned search result) while allowing a user to customize the visualization of the data set and/or customize a search based on the visual data. System 100 can allow a user to specify a data set (e.g., a collection of data) for visualization and manipulation (e.g., by identifying a name or location for each data in the set). In accordance with some aspects, system 100 is configured to retrieve (e.g., search for) a data set based on criteria established by the user (e.g., search request based on keywords, key phrases, or the like).

In order for the user to manipulate the visualized results, various filters can be provided that allow filtering within segments and/or each data that is included in the data set. The filter can be selectively applied, whereby only the identified segment has the filter applied without affecting the remaining segments of the data. In a simple example, a data set includes four pieces of data ("Data A", "Data B", "Data C", and "Data D"). Data A, Data B, and Data C have five segments in common, which can be illustrated as one or more connections linking the data (e.g., lines). Data B has two segments (different from the five segments) in common with Data D, which is visualized by one or more connections linking the data. If the user does not need (or does not want to perceive) one or more of the common segments, the user can selectively apply a filter to one or more of the connections linking the data. For example, the user can specifically request that a common segment be excluded from the visual representation. This user specified exclusion can be applied, without affecting the remaining linkages. For example, both the linkages between Data B and Data D can be excluded or removed without affecting the linkages between Data B, Data A, and Data C. In this situation, Data D can still be included in the data set, however, a visual representation can be provided (e.g., a broken connection line) to illustrate that Data D is not related to Data A, Data B, or Data C.

In further detail, system 100 includes a visualization manipulation system 102 that enables a user to comprehend commonalities among data within a data set based on a visual representation, which can be manipulated. The data set can be a collaborative database of information, a set of data, one or more documents, text and data, a voice file, a recorded action, an email, a web page, or other data that can be collected and linked to other data (e.g., as associated data, as unassociated data). Further, the data set can include structured data, unstructured data, semi-structured data, or combinations thereof.

Visualization manipulation system 102 includes an aggregation component 104 that is configured to gather (e.g., collect, obtain, receive) a multitude of data that represents a data set. For example, a user can request a search for data based on key words or phrases. Data that satisfies the search query can be selectively retrieved by aggregation component 104. In another example, the user might specify the data that should be gathered by aggregation component 104. For example, an organization might be seeking to hire a human resource associate and, through advertising, requests that resumes be sent to a specified email alias. The data sent to the email alias (e.g., resumes) might be utilized as the data input to aggregation component 104.

In accordance with some aspects, aggregation component 104 can provide customizable search histories, wherein the data set includes the search history. The search histories can include past searches, a timeline of the searches, the number of results provided, a list of click throughs, and other information that might be useful during a current search. Further, a user can selectively annotate relationships between the searches, search results, and the search histories.

Additionally or alternatively, aggregation component 104 can facilitate incremental revealing of relationships give a current set of characters (e.g., letters, numbers, etc.) of the search request. As a search request is received, each input (e.g., character) can be analyzed and relationships between the search results can be altered in the context of the search. Aggregation component 104 can also provide automatic facet detection, which can provide visual grouping and filtering.

Further, the search results can be aggregated into a time-based format and/or time-based animation, such as a timeline. The results can be organized along the timeline so that a user can understand the data based on when the data was created, modified, and so forth. In accordance with some aspects, the search results are presented as a bar chart that illustrates the number of keywords in each result.

In accordance with another aspect, aggregation component 104 can facilitate building a semantic representation of the results. For example, keyword histograms can be provided across search results and/or a Venn diagram of the results can be provided in order to assist the user in understanding and manipulating the data.

The data can be gathered from one or more data locations (e.g. a data store, a storage medium, a computer readable media, a computer storage media, a server, as well as others). The data locations can be local to system 100 or can be remote from system 100 and accessed through various means (e.g., Intranet, Internet, and so forth). In accordance with some aspects, the data can be gathered directly from a user, through a user interface or other means of providing communication between user and system 100.

The aggregation component 104 can also render (or cause to be rendered) a visual representation of the data set in response to a request for a visual representation. For example, aggregation component 104 can present paths or connection lines that represent linkages or commonalities between data or segments thereof. The visualization of the data can be accomplished though various means including clustering technology, iterative clustering to induce a hierarchy, tree visualization, or other techniques. Additionally, the linkages can be customized and/or annotated by a user to provide further context and user-meaningful data.

A personalization component 106 is configured to accept a customization that filters by one or more segments of at least one of the multitude of data. Based on the filtering applied, the aggregation component 104 can update the visual representation of the data set. For example, a data set includes data, which are photos, wherein each photo is of a dog in a dog show. Segments of the data can relate to a dog breed, an owner name, a city, and a state, as well as other segments. It might be important for the user viewing the data to receive a visualization of the location (e.g., city and state) where the dog lives (e.g., for local advertising purposes). Thus, the linkage relating to dog breed and/or owner can be specifically excluded from the visual representation. However, the linkages that were not deleted (e.g., city, state) are not broken. Thus, the user can still visualize the desired segments (e.g., city and state) while removing the unnecessary visualization of the undesired segments, which can clutter a display screen or complicate the visual representation. This can be advantageous for small screen devices and/or to conserve resources.

Figure 3:
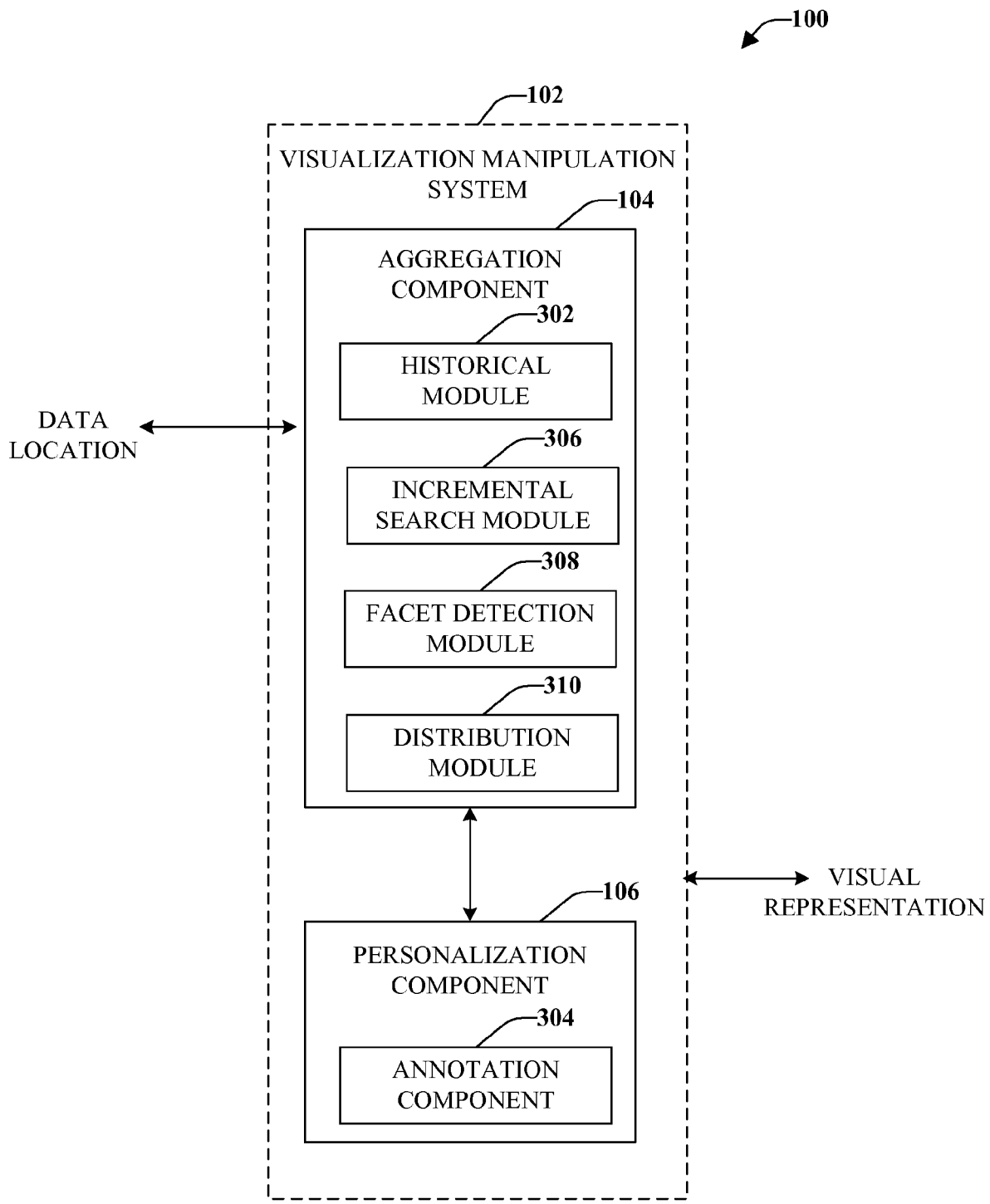
FIG. 3 illustrates an example alternative block diagram of a system that includes a visualization manipulation system in accordance with the disclosed aspects.

FIG. 3 illustrates an example alternative block diagram of a system 100 that includes a visualization manipulation system 102 in accordance with the disclosed aspects. Visualization manipulation system 102 includes an aggregation component 104 that obtains data from one or more data locations based on a request. Also included is a personalization component 106 that accepts one or more customizations related to the obtained data.

In further detail, aggregation component 104 includes a historical module 302 that gathers (e.g., obtains, retrieves, collects) previous searches conducted for a current user. Information gathered from the previous searches can relate to when the searches were conducted, the search results, the number of results, a list of click throughs so that the user can determine which results were actually explored, as well as other information.

Historical module 302 can expose the history of searches in a format that allows the user to visualize the relationships and histories of the previous searches. The user, through interaction with an annotation component 304 associated with personalization component 106, can annotate historical or other information associated with one or more searches. For example, for a particular search, the user can annotate the search by marking or flagging the search and providing information as to what the search was related to, what the user was attempting to accomplish, as well as other information. This annotated information can refresh the user's memory at a later time when the same or a similar search is conducted.

Additionally and/or alternatively, annotation component 304 can provide the user a mechanism for annotating relationships. For example, as relationships are exposed, the user might see an interesting relationship. Through interaction with annotation component 304, the user can mark or flag that relationship and provide comments as to why that relationship is interesting. This can help the user, as well as others, when the relationship is reviewed at a later time to understand the value or the importance of the relationship.

Further, annotation component 304 and/or a user interface can be configured to allow the user to selectively link data and/or provide an annotation (e.g., explaining the link) for a manually created link and/or an automatically generated link. The annotation can include information that might be useful to the user and/or others viewing the linked data as well as any other information the user desired to include.

In accordance with some aspects, aggregation component 104 includes an incremental search module 306 that incrementally reveals relationships. As characters (e.g. letters, numbers, symbols, and so forth) are manually entered, incremental search module 306 can dynamically filter and reveal relationships give a current set of characters. Providing relevant relationships as a function of incremental search can help to narrow a search result and/or provide further context for the user to understand and/or manipulate the data. As more characters are entered, the search results can be automatically narrowed or focused. For example, a user desires to find information relating "JAGUAR". As the user enters "JAG", search results relating to Navy JAG, an automobile, and an animal can be presented as well as the relationships associated with the different results. As the user types "JAGU", the results relating to the Navy JAG can disappear.

As a search is being conducted and a given set of items or data is revealed, there are attributes and aspects associated with each of the items or data. The attributes and/or aspects create a hierarchical facet space over those attributes and allow the user to search through the facet space to expose the item or data being searched. This is similar to a FacetMap that allows users to browse complex metadata in a more simplified and familiar manner. The facet space can be created automatically as search results are presented to the user. In accordance with some aspects, one or more display locations and/or a display layout can be fixed or semi-fixed in order to provide a stable or expected location of certain facets. A stable location and/or layout can mitigate the amount of animation as incremental search results are presented to the user. In accordance with some aspects, the layout can be dynamically changed to reflect the results.

Additionally or alternatively, aggregation component 104 includes a facet detection module 308 that is configured to aggregate the results as a function of automatic facet detection. The facet detection can be conducted automatically as search results are gathered. One or more attributes associated with the search results can be reviewed by facet detection module 308 and a set of facets can be constructed around the discovered facets. In accordance with this aspect, the results can be separated into different sets of interests. Thus, visual grouping and filtering on the discovered facets are automatically produced. According to some aspects, metadata can be utilized to create a structure for the data and data relationships. In accordance with some aspects, linked views can be provided wherein linkages or relationships between data is based on the facets, not on the items in the result set. However, according to some aspects, the linkages or relationships are based on the facets, the items in the result set, or combinations thereof.

In accordance with some aspects, aggregation component 104 includes a distribution module 310 that is configured to selectively organize the search results or sets of data based on various criteria. In accordance with an aspect, the data is distributed on a time line or bar chart. An example of a time line is with respect to a Web search. When a search result is returned, generally the results are presented in an inferred order of preference. However, this order of preference does not provide information relating to how current the results are. For example, some of the results might have been created and/or modified years ago while another result might have been created yesterday. Providing the search results in a time line can enable the user to choose the more current results and ignore (or associate a lesser value) with older results, which can allow the user to understand the unstructured data in a different or more meaningful manner.

According to a related aspect, keyword histograms can be provided across search results. For example, for each search result a histogram of the keywords (or other data) in the search query can be provided by distribution module 310. This histogram can provide information related to the number of occurrences of keywords in the results, the number of keywords, and so forth. The information relating to the number of keywords, the number of occurrence of keywords, and other information can factor into a ranking algorithm that is presented to the user. Based on the presented histogram information the user can utilize the information as desired (e.g., only view results that include all keywords, review results that have a number of occurrences above a threshold level, and so forth).

In another example, a Venn diagram of the results can be provided by distribution module 310. The Venn diagram can provide an appropriate grouping for the search results and/or data set. For example, if there are three query terms, the Venn diagram can include three circles and a subset of each circle can overlap with a subset of one or more of the other circles. The three query terms can be illustrated as scattered within the three circles. If a result includes term "a", that result is in the circle associated with term "a". If a result has term "a" and "b", the result is included in the overlap or intersection of circle "a" and circle "b". If the result includes terms "a", "b", and "c", that results is included in the intersection of all three circles. Thus, distribution module 310 can provide a graphic illustration of the search results and the co-occurrence of keywords.

Figure 4:
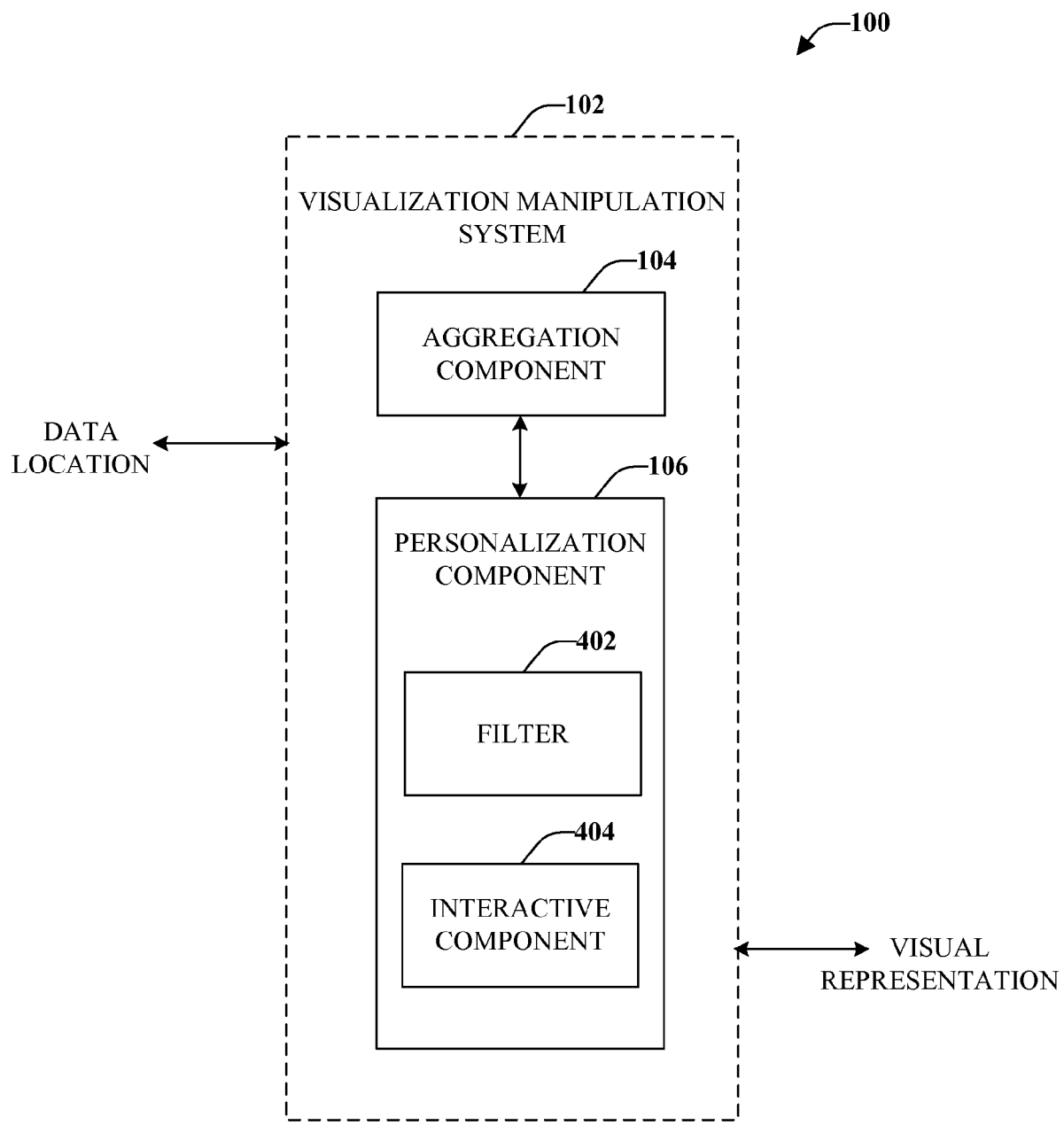
FIG. 4 illustrates an example alternative block diagram of a system that includes a visualization manipulation system.

FIG. 4 illustrates an example alternative block diagram of a system 100 that includes a visualization manipulation system 102. A visual model of a data set can enable filtering and/or selection that can provide customization of the data set. Included in visualization manipulation system 102 is an aggregation component 104 that gathers data together as a data set and provides a visual representation of the relationships among the data in the set (e.g., common segments). Also included is a personalization component 106 that facilitates a user customization to results of the visualization and a presentation format.

Included in personalization component 106 is a filter 402 that can allow a user to selectively exclude data or a segment thereof from the visual representation. In accordance with some aspects, filter 402 can be a noise-type filter that allows a user to specify whether certain data or segments thereof should be removed based on the number of times a segment is included in the data set. Thus, noise filter can mitigate capturing of data that is outside a focus of the data set. For example, if the visual representation is based on the prevalence of words, a visual representation can be provided that relates to this segment (e.g., words) and the noise filter 402 can determine how often the word is represented in the data set. If the number of times the word is represented is below a threshold level, filter 402 can automatically remove a visual representation associated with that word and/or filter 402 can request confirmation from the user whether the visual representation should be removed.

Filter 402 can be configured to exclude something (e.g., a word, phrase, or other segment) that is chosen by the user such that the customization is the result that is returned. For example, in a resume collection process, a huge bubble might be visually displayed that indicates a large number of applicants have C++ experience. If that type of experience is not necessary to fill the position, that criteria (C++) can be deleted or selectively removed by the filter. The visual display is then altered to present more relevant information. In accordance with some aspects, the filter 402 allows data to be included in the visualization.

Customization of search results is provided to allow filtering by filter 402 for specific information, such as for finding all blog articles on a topic. The user can select a subset or a range of articles or reviews. Based on the selected criteria (e.g., only return the articles with positive comments), the filter can collapse the viewed information so that just the positive articles are presented.

In another example, filter 402 can filter "noise" from multiple contributors, such as if the data is a collection of audio data, or a subset of the data is audio data. Utilization of a noise filtering system can mitigate capturing and providing a visual representation of unrelated "noise" or information that is outside focus of the data set. The noise filtering system can also be used to find specific information or a specific contributor (e.g., based on speech analysis), wherein the specific information is visually linked to other data (e.g., an audio recording is visually linked with an image of the person speaking).

Additionally or alternatively, personalization component 106 can include an interactive component 404 that allows a user to drill down into linkages to obtain more information and/or to build a search query based on the visualization. For example, while gathering and reviewing information, marketing personnel might desire to analyze customer feedback (e.g., customer reports) for a product. The search for feedback can include various sources, including blog websites, which can include positive reviews, negative reviews, and/or neutral reviews. The ability to filter for each type of review can be provided by filter 402. Additionally, interactive component 404 can provide controls to allow the user to zoom in on a particular review or subset of a review (e.g., to a specific article or paragraph). Thus, the visual model of search results or data enables filtering, selection, iterative searching, and so forth.

Visualization manipulation system 102 can be operatively connected with various types of user interfaces such as a graphical user interface (GUI), a command line interface, a speech interface, Natural Language text interface, and the like, to allow a user to interact with system 102. For example, a GUI can be rendered that provides a user with a region or means to input modifications, request for data, and the like, and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the information conveyance such as vertical and/or horizontal scroll bars for navigation and toolbar buttons to determine whether a region will be viewable can be employed.

The user can also interact with the regions to select and provide information through various devices such as a mouse, a roller ball, a keypad, a keyboard, a pen, gestures captured with a camera, and/or voice activation, for example. Typically, a mechanism such as a push button or the enter key on the keyboard can be employed subsequent to entering the information in order to initiate information conveyance. However, it is to be appreciated that the disclosed embodiments are not so limited. For example, merely highlighting a check box can initiate information conveyance. In another example, a command line interface can be employed. For example, the command line interface can prompt the user for information by providing a text message, producing an audio tone, or the like. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Figure 5:
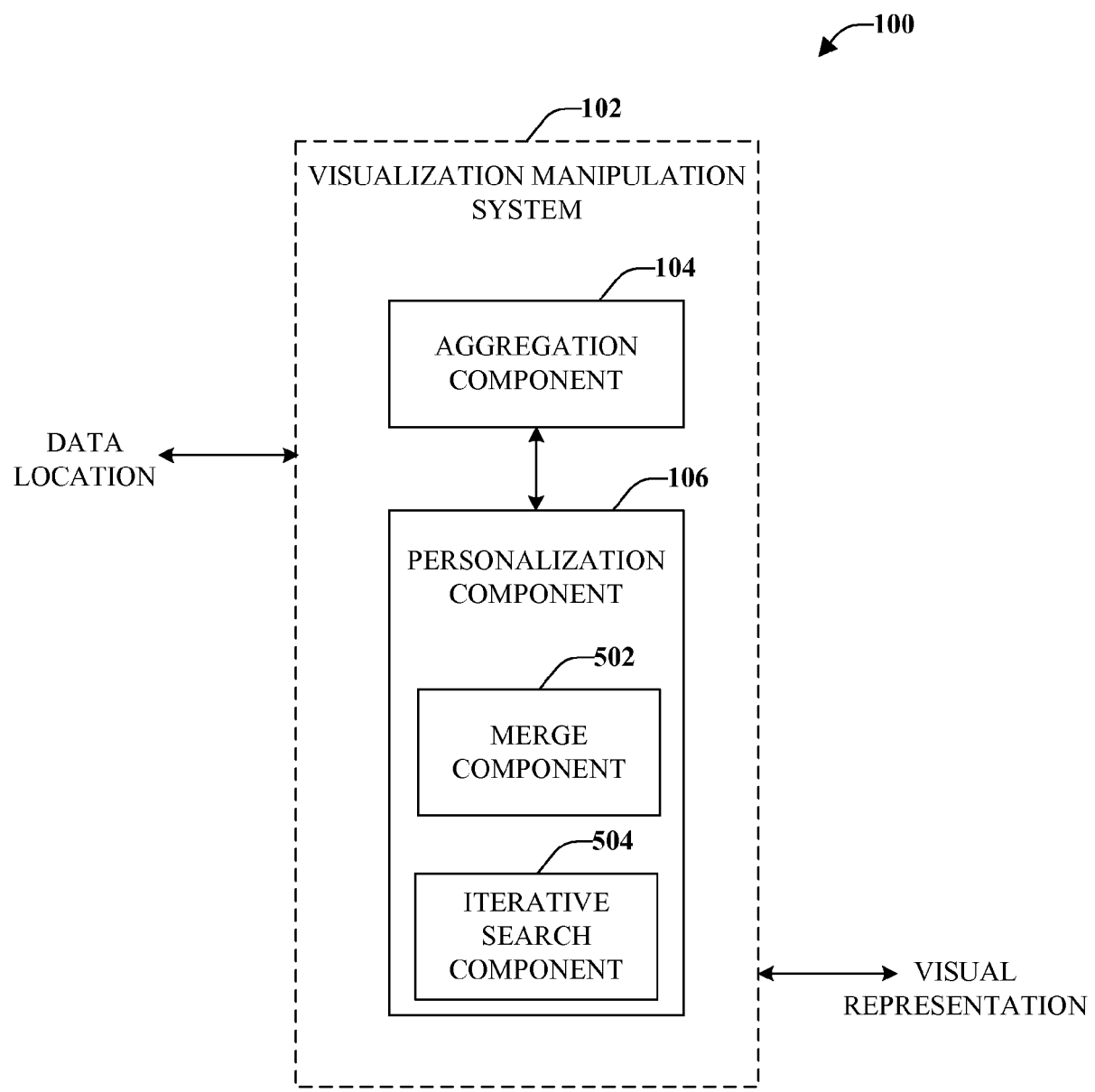
FIG. 5 illustrates another example alternative block diagram of a system that includes a visualization manipulation system.

FIG. 5 illustrates another example alternative block diagram of a system 100 that includes a visualization manipulation system 102. A visual model of a data set can enable iterative searching and/or categorization of data. Included in visualization manipulation system 102 is an aggregation component 104 that gathers data together as a collection of data (e.g., data set) and provides a visual representation of the data as well as the relationships of segments of the data. A personalization component 106 that facilitates a user customization to results of the visualization and a presentation format is also provided.

Included in personalization component 106 is a merge component 502 that can selectively combine two or more data sets and provide a visual representation of the data as well as related content and/or concepts across the multiple results. For example, a first search might be conducted for "Nuclear Reactor Disasters." Aggregation component 104 can retrieve a set of search results and present those results to the user. The search results can be customized through interaction with personalization component 106 (e.g., utilizing filter 402 and/or interactive component 404). The user can selectively save the search results in a computer readable medium (not shown) and/or can share the result with another user. A second search might be conducted by the user that relates to "Alternative Energy Sources" and a set of search results is retrieved by aggregation component 104 and customized through interaction with personalization component 106. This search can be saved for later retrieval and/or sharing purposes. If desired, the user can combine the first search result related to "Nuclear Reactor Disasters" with the results for "Alternative Energy Sources" through merge component 502. Based on this merge, aggregation component 104 can provide a visualize representation of related content and/or concepts across these multiple results. Further customization (e.g., filtering, interaction, exclusion of segments or linkages, and so forth) can be conducted on the combination of data sets.

In accordance with some aspects, merge component 502 can operate in conjunction with historical module 302 to present the user with not only manually selected searches but also previous searches that system 100 infers are related to a current search. For example, the user might request that the "Nuclear Reactor Disasters" and "Alternative Energy Sources" be combined (by merge component 502). Historical module 302 might determine that a previous search, such as "Energy Conservation", is related to the two requested searches. In this case, the user can be presented with the historical information discovered by historical module 302 and given the opportunity to accept or deny the merging of the three (or more) historical searches. In such a manner, if the previous search was requested days, weeks, or years ago, the user might not remember the search. However, any information related to the previous search, as gathered by historical module 302 can be merged with the current search set, which can assist in the user's understanding and manipulation of the merged search set.

In accordance with some aspects, an iterative search component 504 is provided that allows a user to change a data set as information about the data set is discovered. For example, a student might be required to write a report that relates to the Underground Railroad for history class. As the student searches for something interesting to write about something that happened over one hundred and fifty years ago, search results are returned and a visual representation of the results are presented to the user. By reviewing the linkages (e.g., connections) between the data and segments thereof, the student finds quite a few results that relate to Harriet Tubman; however, even though there is a lot of information found, the student wants to write something that is different from what the other students are writing. By carefully reviewing the information and drilling down into linkages (e.g., through interaction with interactive component 304), the student discovers that Native Americans played a role in the Underground Railroad, which is of interest to the student. Thus, the student can interact with iterative search component 504 to refocus the search results based on the linkage data (e.g., the linkage to the Native American topic). Iterative search component 504 can use the original search, "Underground Railroad", as a starting point (mitigating the need for the user to reenter the search terms) and include information related to Native Americans (and related concepts) to provide another more focused data set, which can be further customized in accordance with the aspects disclosed herein.

The various aspects (e.g., in connection with customization and manipulate of visualized data) can employ various machine learning schemes (e.g., artificial intelligence, rules based logic, and so forth) for carrying out various aspects thereof. For example, a process for illustrating related content or content and determining whether to include or exclude certain data can be facilitated through an automatic classifier system and process.

Artificial intelligence based systems (e.g., explicitly and/or implicitly trained classifiers) can be employed in connection with performing inference and/or probabilistic determinations and/or statistical-based determinations as in accordance with one or more aspects as described herein. As used herein, the term "inference" refers generally to the process of reasoning about or inferring states of the system, environment, and/or user from a set of observations as captured through events, sensors, and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the disclosed aspects.

In view of the exemplary systems shown and described above, methodologies that may be implemented in accordance with the disclosed subject matter, will be better appreciated with reference to the following flow charts. While, for purposes of simplicity of explanation, the methodologies are shown and described as a series of blocks, it is to be understood and appreciated that the disclosed aspects are not limited by the number or order of blocks, as some blocks may occur in different orders and/or at substantially the same time with other blocks from what is depicted and described herein. Moreover, not all illustrated blocks may be required to implement the methodologies described hereinafter. It is to be appreciated that the functionality associated with the blocks may be implemented by software, hardware, a combination thereof or any other suitable means (e.g. device, system, process, component). Additionally, it should be further appreciated that the methodologies disclosed hereinafter and throughout this specification are capable of being stored on an article of manufacture to facilitate transporting and transferring such methodologies to various devices. Those skilled in the art will understand and appreciate that a methodology could alternatively be represented as a series of interrelated states or events, such as in a state diagram.

Figure 6:
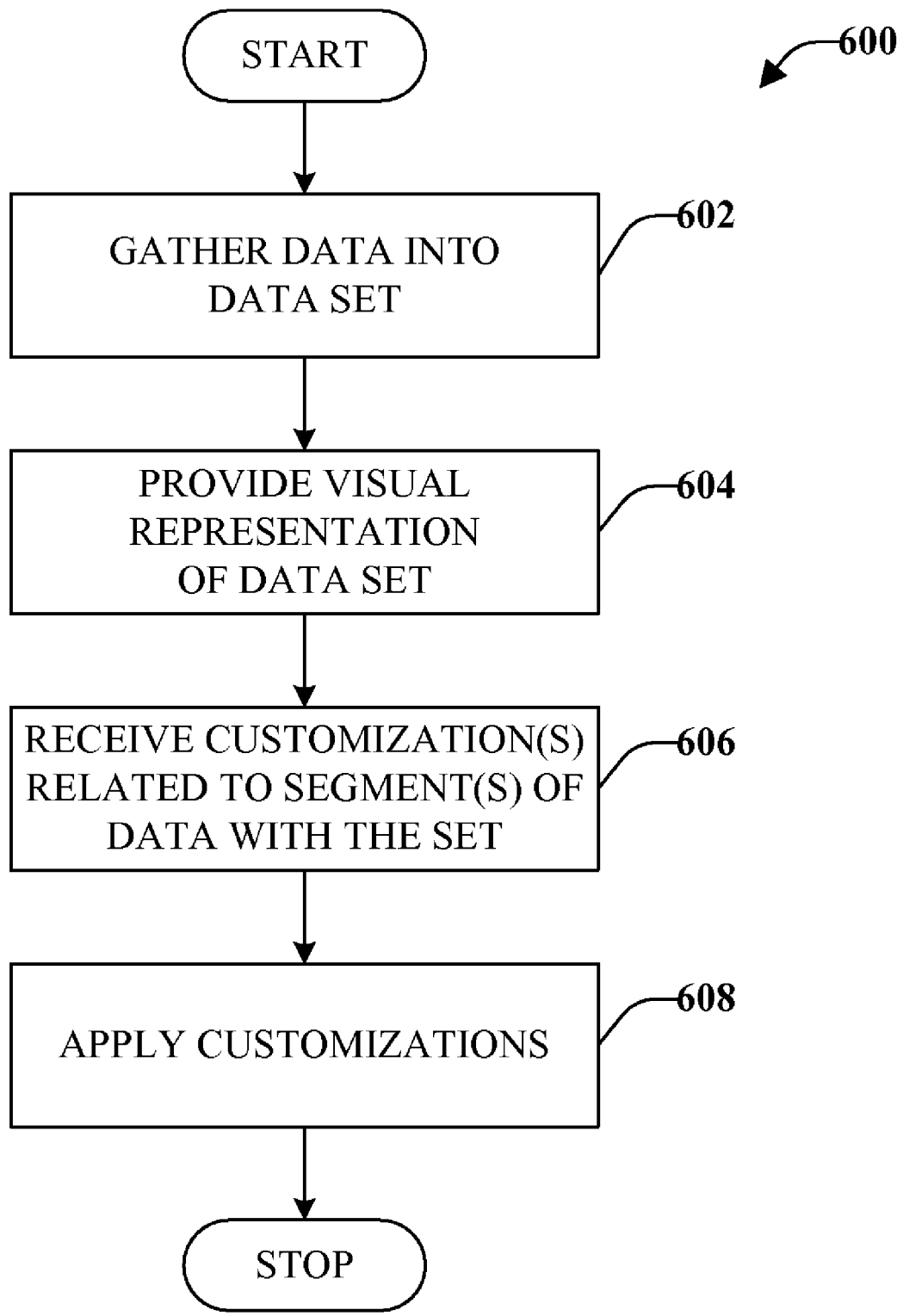
FIG. 6 illustrates a method of providing manipulation of a data set in accordance with the disclosed aspects.

FIG. 6 illustrates a method of providing manipulation of a data set in accordance with the disclosed aspects. The data set can be customized by providing a visual representation of related content and/or concepts and allowing the user to apply filtering techniques as disclosed herein.

At 602, a multitude of data is gathered into a data set. This multitude of data can be gathered based on a request for the data, which can be in the form of a search request (e.g., a key word search) or another request (e.g., input 10 resumes into the system to quickly visualize how the applicants compare to each other). In accordance with some aspects, the multitude of data can be gathered based on an explicit request for gathering of the data. For example, a user can specify the data or a location where the data can be found (e.g., a request for all data in a directory or subdirectory). According to some aspects, the data can be gathered from an email account or other location.

At 604, the data set is rendered to the user in a perceivable format whereby the user can visualize the data and how the data is related or is not related. The data can be rendered (e.g., presented, displayed, output, and so on) to the user in various formats. For example, the data can be rendered as a search history that includes information such as past searches, a timeline of the searches, a number of search results, a list of click throughs, and so forth. In accordance with some aspects, the data can be rendered in an incremental search formation wherein relationships are revealed or hidden based on a current search request (or subset of the search request). According to some aspects, automatic facet detection is provided to render the data set. The data can be presented as separate result types or based on visual grouping and filtering. Metadata can be utilized to structure linked views. Further, keywords can define axes or attractors in the facet detection. Additionally or alternatively, the data set can be rendered as a function of a timeline, bar graph, histogram, Venn diagram, or combinations thereof.

One or more customizations to at least a segment included in the set is received, at 606. The customization can include excluding data or a segment from the visualization (e.g., remove this link and similar links) without losing (or excluding) any of the search results (e.g., data). For example, after reviewing fifty search results that relate to hospitals, the user desires to exclude from the visual representation results (e.g., a linkage between two or more segments of the data) that include a particular doctor (e.g., the name is a common name and is not relevant to the user's goals). Method 600 allows the user to selectively exclude certain segments of the data (e.g., the doctor) from the visual representation while allowing other linkages relating to other segments of the data to be included in the visual representation. Thus, method 600 can provide the same search results that are now presented in a format that is personalized for the user. The customization might also allow the user to add annotation to links, wherein the annotations provide user specific data related to the links or data.

The customization can also include filtering for noise or for common relationships that are below a predetermined threshold level, thus reducing the amount of data displayed. In accordance with some aspects, the customization relates to drilling down into one or more linkages to customize a search result based on information within a current data set. The customizations are applied, at 608, and the result is presented to the user as a visual representation of the data set. If the customization relates to conducting another search based on one or more linkages, the new search result is presented to the user.

Figure 7:
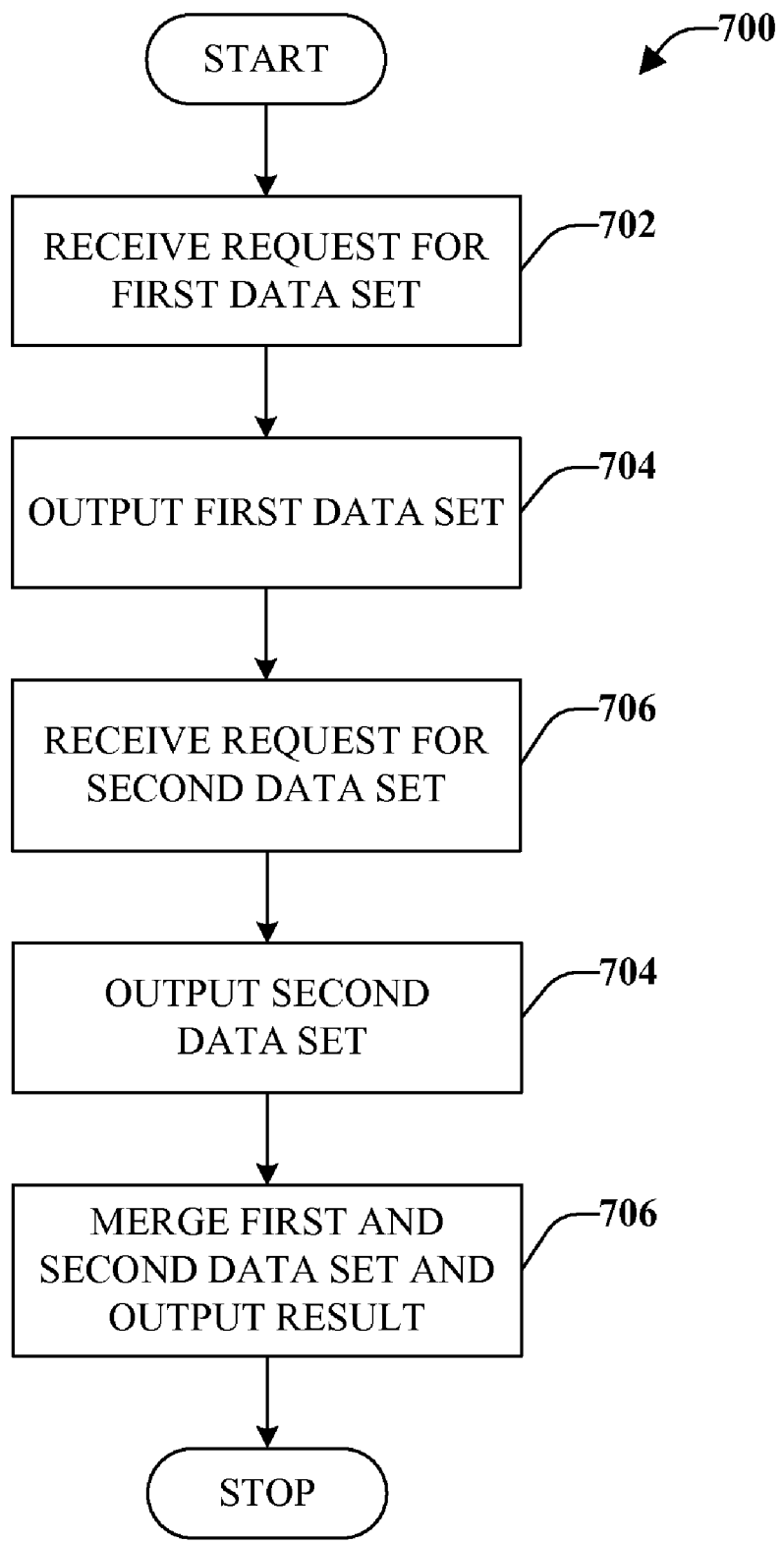
FIG. 7 illustrates a method for combining two or more data sets and rendering a visual representation of the combination.

FIG. 7 illustrates a method 700 for combining two or more data sets and rendering a visual representation of the combination. At 702, a request for a first data set is received. This request can be in the form of a search query or in the form of data that is specifically provided by the user. A visualization of the result of the request (e.g., the first data set) is presented to the user, at 704. The visualization of the first data set can be customized utilizing one or more of the customization aspects presented herein.

At 706, a request for a second set of data is received. The second set of data can be related to the first set of data (e.g., National Parks and Wildlife), or can be unrelated (e.g., Glass and Ocean). A visual representation of the second set of data is provided and customization can be applied.

Based upon a user request, the first data set and the second data set can be combined, at 708, and a visual representation of related content and/or related concepts can be output to the user in any perceivable format. In such a manner, the user can visualize a commonality between the two data sets. In a very simple example, if the first data set is "Glass" and the second data set is "Ocean" a related concept can be "Sand", which can allow the user to perform other functions related to the data sets (e.g., perform another search based on the common linkage and so forth).

Figure 8:
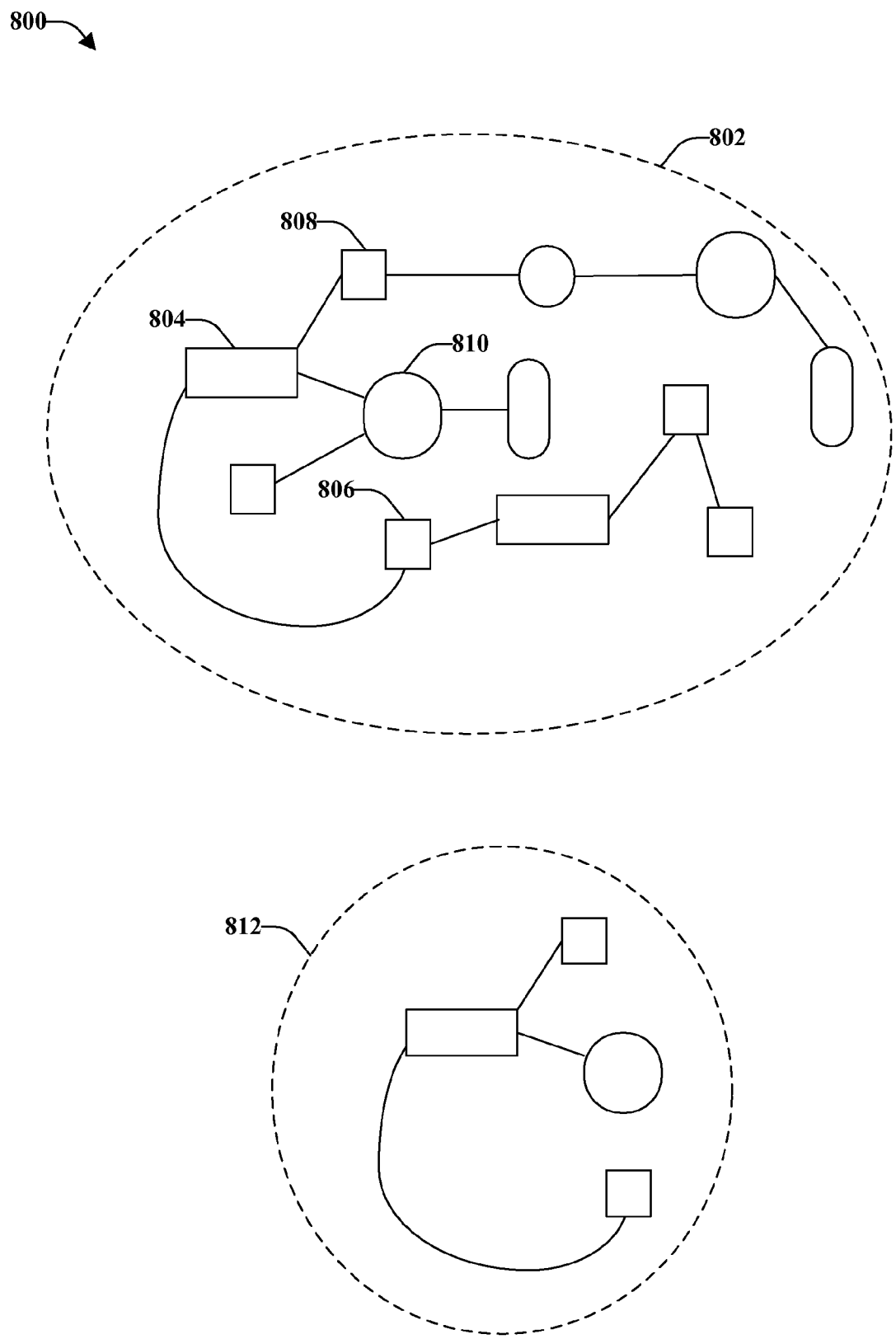
FIG. 8 illustrates a graphical representation of customizing a data set by focusing on data or segments of the data.

FIG. 8 illustrates a graphical representation 800 of customizing a data set by focusing on data or segments of the data. A data set 802 is provided to the user in response to a request. The data set 802 includes a number of different data types, shown graphically by different geometric shapes and sizes. Common linkages (e.g., related content, related concepts) are illustrated graphically by a connection line linking two or more data or data segments. It should be understood that other techniques for identifying common linkages can be utilized and a line is illustrated and discussed for purposes of simplicity.

A user might be interested in data, labeled 804, and is only interested in data that is common with this data 804. For example, data that is common with data 804, is data 806, 808, and 810 (e.g., has a direct link to data 804). The other data in the data set 802 is indirectly related to data 804, and, based on the narrow focus of the filter applied by user, are removed from the data set. Thus, a filter can be applied, based on user selected criteria, which focuses the data set into a subset of the original data set, as illustrated at 812, which only includes the three data that have the direct link to data 804.

Figure 9:
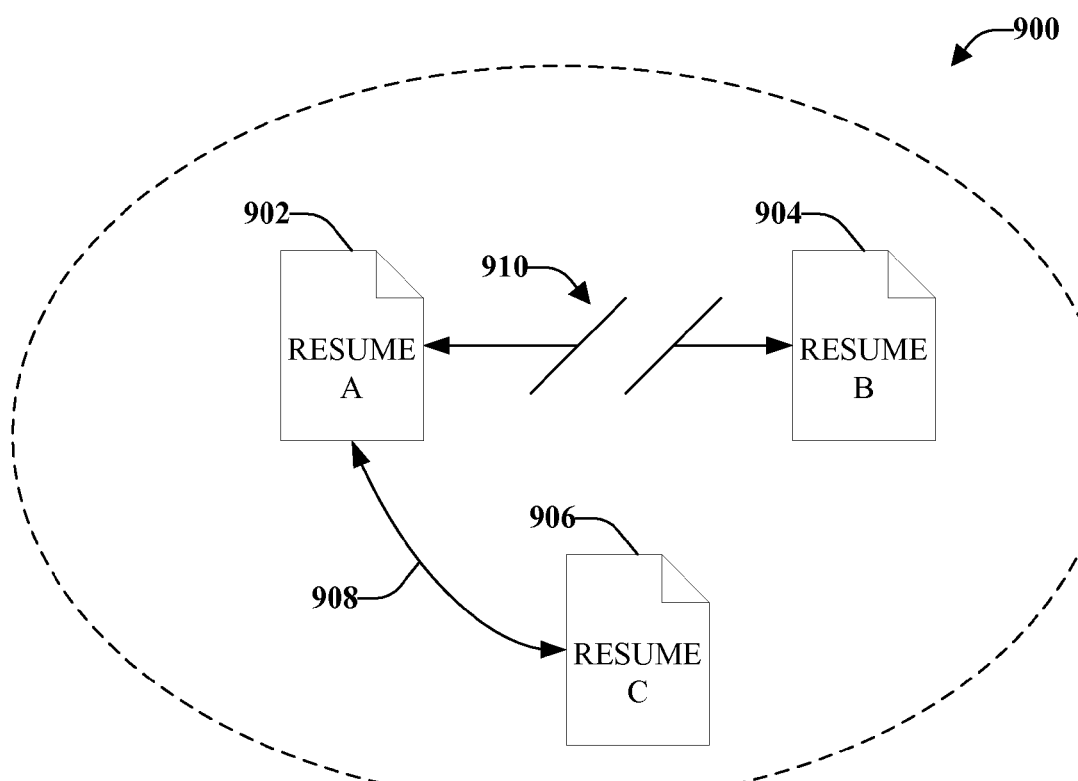
FIG. 9 illustrates an example visualization of linked and unlinked data paths that illustrated related and unrelated concepts.

FIG. 9 illustrates an example visualization of linked and unlinked data paths that illustrated related and unrelated concepts. Three resumes are illustrated, "Resume A" 902, "Resume B" 904, and "Resume C" 906. Each of the resumes can be a resume that was provided for an open position in an organization or for multiple open positions within an organization or across organizations (e.g., a temporary agency).

As illustrated Resume A 902 and Resume C 906 have a linked data path 908, which indicates that there is a similarity in at least one segment of each resume. For example, the applicants associated with Resume A 902 and Resume C 906 both have Ph.D. degrees in Clinical Psychology. The linkage between Resume A 902 and Resume B 904 illustrates unlinked data 910 (unlinked data could also be presented between Resume B 904 and Resume C 906). For example, the applicant associated with Resume A 902 has a Ph.D. degree in Clinical Psychology and the applicant associated with Resume B 904 has a Degree in Criminal Justice. This information might be important to the person making the hiring decision (e.g., is the position an entry-level position at a local police department or for a college teaching position related to psychology). Thus, although a number of resumes might be related (e.g., jobs are scarce in the psychology field), that relationship might have nothing to do with the needs of the employer. Utilizing the disclosed aspects, the employer can quickly sort though the resumes, which can quicken the hiring process.

Figure 10:
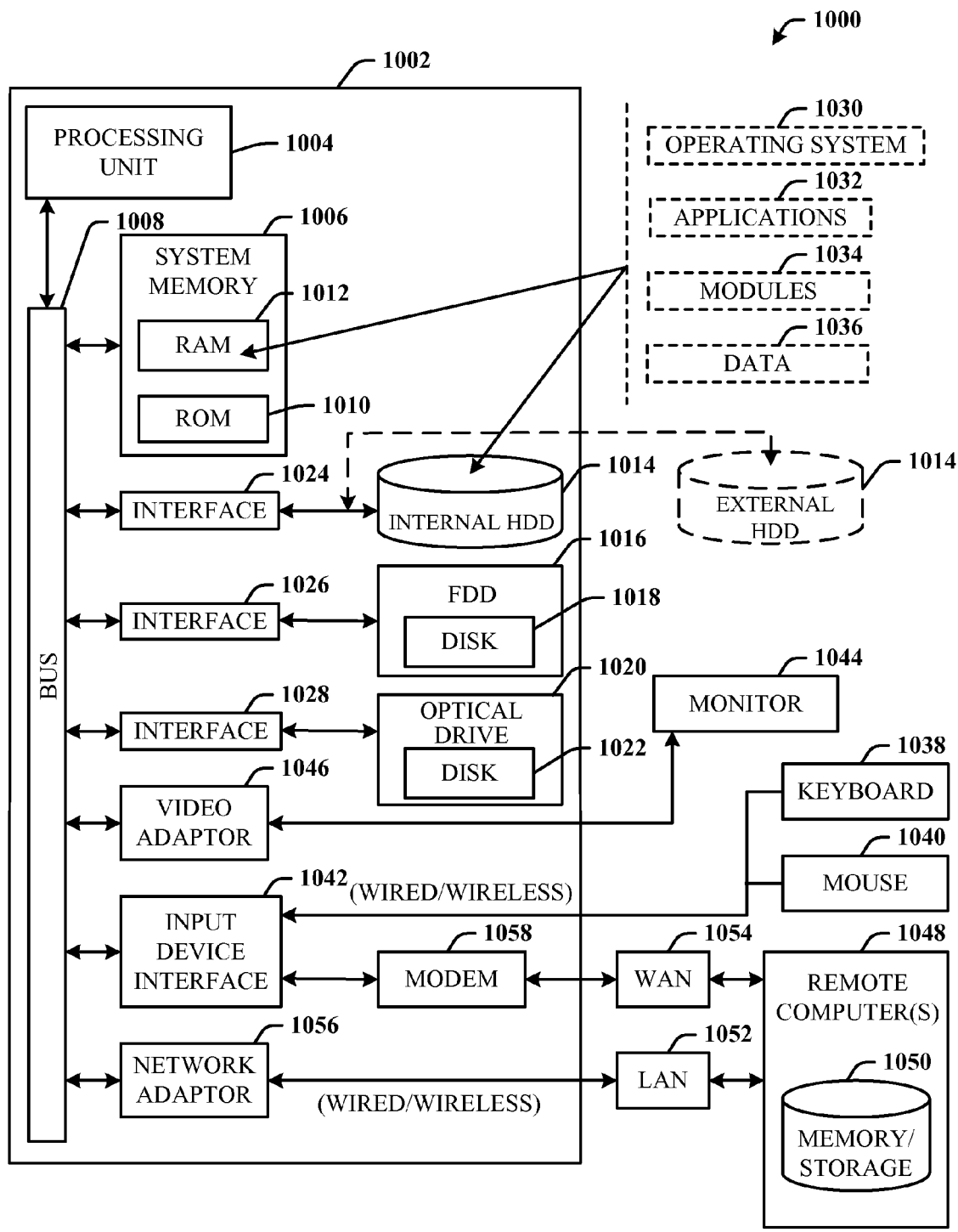
FIG. 10 illustrates a block diagram of a computer operable to execute the disclosed architecture.

In accordance with some aspects, a user can provide customized annotations that are associated with one or more linked or unlinked paths. The customized annotations allow the user to provided information as to why a path was linked (or unlinked). The annotations can also include other information that might be useful to understand the data and data relationships at a later time Referring now to FIG. 10, there is illustrated a block diagram of a computer operable to execute the disclosed architecture. In order to provide additional context for various aspects disclosed herein, FIG. 10 and the following discussion are intended to provide a brief, general description of a suitable computing environment 1000 in which the various aspects can be implemented. While the one or more aspects have been described above in the general context of computer-executable instructions that may run on one or more computers, those skilled in the art will recognize that the various aspects also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 10, the exemplary environment 1000 for implementing various aspects includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures may also be employed as the processing unit 1004.

The system bus 1008 can be any of several types of bus structure that may further interconnect to a memory bus (with or without a memory controller), a peripheral bus, and a local bus using any of a variety of commercially available bus architectures. The system memory 1006 includes read-only memory (ROM) 1010 and random access memory (RAM) 1012. A basic input/output system (BIOS) is stored in a non-volatile memory 1010 such as ROM, EPROM, EEPROM, which BIOS contains the basic routines that help to transfer information between elements within the computer 1002, such as during start-up. The RAM 1012 can also include a high-speed RAM such as static RAM for caching data.

The computer 1002 further includes an internal hard disk drive (HDD) 1014 (e.g., EIDE, SATA), which internal hard disk drive 1014 may also be configured for external use in a suitable chassis (not shown), a magnetic floppy disk drive (FDD) 1016, (e.g., to read from or write to a removable diskette 1018) and an optical disk drive 1020, (e.g., reading a CD-ROM disk 1022 or, to read from or write to other high capacity optical media such as the DVD). The hard disk drive 1014, magnetic disk drive 1016 and optical disk drive 1020 can be connected to the system bus 1008 by a hard disk drive interface 1024, a magnetic disk drive interface 1026 and an optical drive interface 1028, respectively. The interface 1024 for external drive implementations includes at least one or both of Universal Serial Bus (USB) and IEEE 1394 interface technologies. Other external drive connection technologies are within contemplation of the one or more aspects.

The drives and their associated computer-readable media provide nonvolatile storage of data, data structures, computer-executable instructions, and so forth. For the computer 1002, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. It is appreciated that the various aspects can be implemented with various commercially available operating systems or combinations of operating systems.

A user can enter commands and information into the computer 1002 through one or more wired/wireless input devices, e.g., a keyboard 1038 and a pointing device, such as a mouse 1040. Other input devices (not shown) may include a microphone, an IR remote control, a joystick, a game pad, a stylus pen, touch screen, or the like. These and other input devices are often connected to the processing unit 1004 through an input device interface 1042 that is coupled to the system bus 1008, but can be connected by other interfaces, such as a parallel port, an IEEE 1394 serial port, a game port, a USB port, an IR interface, etc.

A monitor 1044 or other type of display device is also connected to the system bus 1008 through an interface, such as a video adapter 1046. In addition to the monitor 1044, a computer typically includes other peripheral output devices (not shown), such as speakers, printers, etc.

The computer 1002 may operate in a networked environment using logical connections through wired and/or wireless communications to one or more remote computers, such as a remote computer(s) 1048. The remote computer(s) 1048 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1050 is illustrated. The logical connections depicted include wired/wireless connectivity to a local area network (LAN) 1052 and/or larger networks, e.g., a wide area network (WAN) 1054. Such LAN and WAN networking environments are commonplace in offices and companies, and facilitate enterprise-wide computer networks, such as intranets, all of which may connect to a global communications network, e.g., the Internet.

When used in a LAN networking environment, the computer 1002 is connected to the local network 1052 through a wired and/or wireless communication network interface or adapter 1056. The adaptor 1056 may facilitate wired or wireless communication to the LAN 1052, which may also include a wireless access point disposed thereon for communicating with the wireless adaptor 1056.

When used in a WAN networking environment, the computer 1002 can include a modem 1058, or is connected to a communications server on the WAN 1054, or has other means for establishing communications over the WAN 1054, such as by way of the Internet. The modem 1058, which can be internal or external and a wired or wireless device, is connected to the system bus 1008 through the serial port interface 1042. In a networked environment, program modules depicted relative to the computer 1002, or portions thereof, can be stored in the remote memory/storage device 1050. It will be appreciated that the network connections shown are exemplary and other means of establishing a communications link between the computers can be used.

The computer 1002 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from home, in a hotel room, or at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 11:
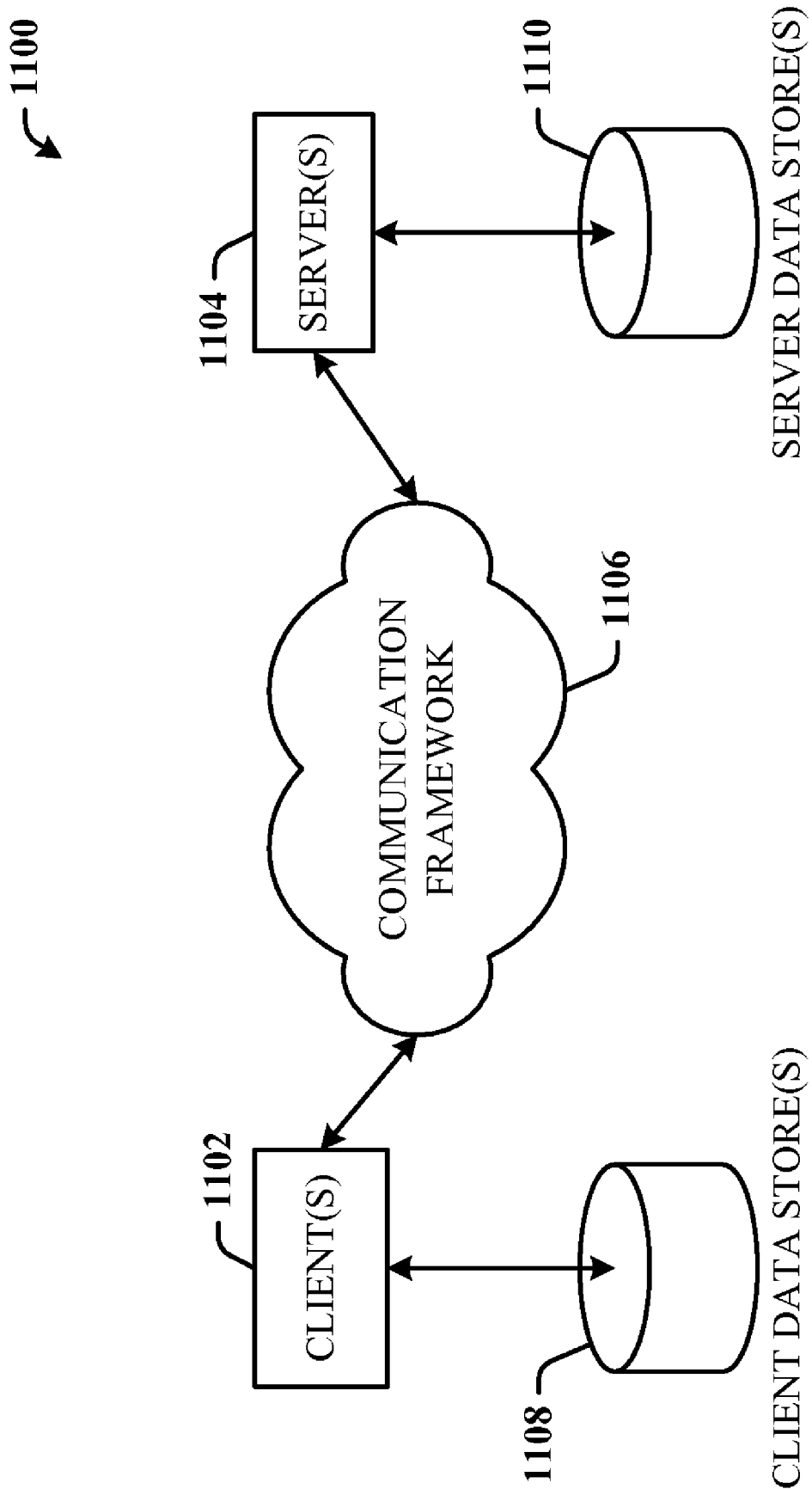
FIG. 11 illustrates a schematic block diagram of an exemplary computing environment in accordance with the various aspects.

Referring now to FIG. 11, there is illustrated a schematic block diagram of an exemplary computing environment 1100 in accordance with the various aspects. The system 1100 includes one or more client(s) 1102. The client(s) 1102 can be hardware and/or software (e.g., threads, processes, computing devices). The client(s) 1102 can house cookie(s) and/or associated contextual information by employing the various aspects, for example.

The system 1100 also includes one or more server(s) 1104. The server(s) 1104 can also be hardware and/or software (e.g., threads, processes, computing devices). The servers 1104 can house threads to perform transformations by employing the various aspects, for example. One possible communication between a client 1102 and a server 1104 can be in the form of a data packet adapted to be transmitted between two or more computer processes. The data packet may include a cookie and/or associated contextual information, for example. The system 1100 includes a communication framework 1106 (e.g., a global communication network such as the Internet) that can be employed to facilitate communications between the client(s) 1102 and the server(s) 1104.

Communications can be facilitated through a wired (including optical fiber) and/or wireless technology. The client(s) 1102 are operatively connected to one or more client data store(s) 1108 that can be employed to store information local to the client(s) 1102 (e.g., cookie(s) and/or associated contextual information). Similarly, the server(s) 1104 are operatively connected to one or more server data store(s) 1110 that can be employed to store information local to the servers 1104.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification intended to embrace all such alterations, modifications, and variations.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. To the extent that the terms "includes," and "including" and variants thereof are used in either the detailed description or the claims, these terms are intended to be inclusive in a manner similar to the term "comprising." The term "or" as used in either the detailed description of the claims is meant to be a "non-exclusive or".

The word "exemplary" as used herein to mean serving as an example, instance, or illustration. Any aspect or design described herein as "exemplary" is not necessarily to be construed as preferred or advantageous over other aspects or designs.

Furthermore, the one or more aspects may be implemented as a method, apparatus, or article of manufacture using standard programming and/or engineering techniques to produce software, firmware, hardware, or any combination thereof to control a computer to implement the disclosed aspects. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope of the disclosed aspects.

What is claimed is:

1. A system that facilitates manipulation of visualized data, comprising:
   one or more processors;
   a memory communicatively coupled to the one or more processors, the memory comprising components including:
      an aggregation component stored in the memory and executable by the one or more processors and configured to gather a plurality of data that represents a data set and render a visual representation of the data set in response to a request, the data set including a search history comprising an annotation associated with a relationship across two or more searches in the search history, wherein the relationship across the two or more searches is a manually created link, and the annotation includes data that is associated with the manually created link; and
      a personalization component stored in the memory and executable by the one or more processors and configured to accept a customization that filters by a segment of at least one of the plurality of data, the aggregation component further configured to update the visual representation of the data set based on the customization, wherein the plurality of data includes structured data, unstructured data, or combinations thereof.

2. The system of claim 1, further comprising an incremental search module stored in the memory and executable by the one or more processors and configured to incrementally reveal relationships within the data set.

3. The system of claim 1, further comprising a noise filter to mitigate capturing of data that is outside a focus of the data set.

4. The system of claim 1, further comprising an interactive component stored in the memory and executable by the one or more processors and configured to allow a user to drill down into a linkage associated with two or more of the plurality of data to obtain more information related to the linkage.

5. The system of claim 1, further comprising a merge component stored in the memory and executable by the one or more processors and configured to combine two or more data sets, the personalization component being configured to apply customizations to the combined data sets.

6. The system of claim 1, further comprising a facet detection module stored in the memory and executable by the one or more processors and configured to aggregate the data set as a function of automatic facet detection.

7. The system of claim 1, further comprising a distribution module stored in the memory and executable by the one or more processors and configured to organize the data set in at least one of a time line, a bar chart, a histogram, a Venn diagram, or combinations thereof.

8. The system of claim 1, wherein the visual representation includes linked paths for related content and unlinked paths for unrelated content, wherein customized annotations are associated with one or more of the linked or unlinked paths.

9. A computer-implemented method of facilitating manipulation of data, comprising:
gathering a plurality of data into a data set in response to a first request comprising at least one character entry, the data set including an annotation associated with a relationship across two or more previously conducted searches, wherein the relationship across the two or more previously conducted searches is a manually created link, and the annotation includes data that is associated with the manually created link;
providing a visual representation of the data set as at least one of a time line, a bar chart, a histogram, a Venn diagram, or combinations thereof;
incrementally revealing relationships across two or more of the plurality of data in response to a second request comprising an additional character entry;
receiving one or more customizations related to a segment of the plurality of data included in the data set;
applying the one or more customizations; and
outputting a result of the one or more customizations in a visualized format.

10. The method of claim 9, wherein the one or more customizations are a specific request to exclude a visual representation of at least one common segment or to annotate a linkage between the at least one common segment.

11. The method of claim 9, further comprising dynamically altering the visual representation of the data set based on the incrementally revealing.

12. The method of claim 9, wherein the plurality of data is gathered into the data set based on receipt of one or more data to be included in the data set or based on historical searches.

13. The method of claim 9, further comprising:
gathering a second plurality of data into a second data set;
combining the data set with the second data set; and
presenting a visual representation of the combined data sets.

14. The method of claim 9, wherein the visual representation includes linked paths for related content and unlinked paths for unrelated content, wherein one or more of the linked or unlinked paths include customized annotations.

15. The method of claim 9, wherein the segment is information contained within one or more of the plurality of data.

16. A computer-executable system comprising:
means for gathering data to be included in a first data set and a second data set, the data being gathered as a function of a current search request and a search history that is inferred by the system to be related to the current search request, the search history comprising an annotation associated with a relationship across two or more searches in the search history, wherein the relationship across the two or more searches is a manually created link, and the annotation includes data that is associated with the manually created link;
means for providing a visual representation of related content between segments of the data;
means for displaying the visual representation with at least one customizable linked path for the related content or a customizable unlinked path for unrelated content;
means for obtaining a request to customize the visual representation to exclude a user specified related content; and
means for applying a customization to the first data set and the second data set based on the request to customize, the means for displaying the visual representation being configured to display the customization as a time line, a bar chart, a histogram, a Venn diagram, or combinations thereof.

17. The computer-executable system of claim 16, further comprising:
means for merging a third data set with the first data set and the second data set, the means for displaying the visual representation being configured to display the merged data sets.

18. The computer-executable system of claim 16, the means for providing the visual representation being configured to utilize automatic facet detection.

19. The computer-executable system of claim 16, the means for providing the visual representation being configured to incrementally reveal relationships between the related content.

* * * * *